United States Patent
Liang et al.

(10) Patent No.: US 9,143,388 B2
(45) Date of Patent: Sep. 22, 2015

(54) METHOD FOR NETWORK DOMAIN NAME RESOLUTION AND THE RESOLUTION DEVICE THEREOF

(75) Inventors: Jun Liang, Shanghai (CN); Yuan Lin, Shanghai (CN)

(73) Assignee: Shanghai Kelu Software Co., Ltd., Shanghai (CN)

( * ) Notice: Subject to any disclaimer, the term of this patent is extended or adjusted under 35 U.S.C. 154(b) by 788 days.

(21) Appl. No.: 13/058,532

(22) PCT Filed: Oct. 30, 2008

(86) PCT No.: PCT/CN2008/072881
§ 371 (c)(1),
(2), (4) Date: Feb. 10, 2011

(87) PCT Pub. No.: WO2010/017680
PCT Pub. Date: Feb. 18, 2010

(65) Prior Publication Data
US 2011/0202669 A1     Aug. 18, 2011

(30) Foreign Application Priority Data
Aug. 11, 2008   (CN) .......................... 2008 1 0043697

(51) Int. Cl.
*H04L 29/12* (2006.01)
*H04L 12/64* (2006.01)
(52) U.S. Cl.
CPC ...... *H04L 29/12066* (2013.01); *H04L 12/6418* (2013.01); *H04L 29/12594* (2013.01); *H04L 61/1511* (2013.01); *H04L 61/303* (2013.01)

(58) Field of Classification Search
CPC ...................... H04L 29/12066; H04L 61/1511
USPC .......................................................... 709/228
See application file for complete search history.

(56) References Cited

U.S. PATENT DOCUMENTS

| | | | |
|---|---|---|---|
| 2004/0210672 A1* | 10/2004 | Pulleyn et al. | 709/245 |
| 2007/0124487 A1* | 5/2007 | Yoshimoto et al. | 709/230 |
| 2007/0174461 A1* | 7/2007 | Reilly | 709/226 |

FOREIGN PATENT DOCUMENTS

WO   PCT/CN2008/072881   3/2009

* cited by examiner

*Primary Examiner* — Suraj Joshi
(74) *Attorney, Agent, or Firm* — Wang Law Firm, Inc.; Li K. Wang; Stephen Hsu

(57) ABSTRACT

The invention relates to a method for network domain name resolution, the domain name comprises a first portion domain name and a second portion domain name, and the resolution method comprising following steps: In a first network system, resolving the first portion domain name into a first network address; In the first network system, searching for a first network node corresponding to the first network address according to the resolved first network address; In a second network system, resolving the second portion domain name into a second network node address, and the domain name resolution system of the second network system being independent of the domain name resolution system of the first network system. As the resolution structure of the domain name in the Intranet is independent of the resolution structure of the domain name in the Internet, the IP address of the Intranet will not occupy the IP address resource of the Internet.

18 Claims, 10 Drawing Sheets

| Intranet node | F1 | | F2 | | F3 | | F4 |
|---|---|---|---|---|---|---|---|
| (1,1) | East Petroleum | | | | | | |
| (2,1) | East Petroleum | . | Nanjing | | | | |
| (2,2) | East Petroleum | . | Shanghai | | | | |
| (2,3) | East Petroleum | . | Hangzhou | | | | |
| (2,1,1) | East Petroleum | . | Nanjing | . | $Pipe_1$ | | |
| (2,1,2) | East Petroleum | . | Nanjing | . | $Pipe_2$ | | |
| (2,2,1) | East Petroleum | . | Shanghai | . | $Pipe_1$ | | |
| (2,2,2) | East Petroleum | . | Shanghai | . | $Pipe_2$ | | |
| (2,3,1) | East Petroleum | . | Hangzhou | . | $Pipe_1$ | | |
| (2,3,2) | East Petroleum | . | Hangzhou | . | $Pipe_2$ | | |
| (2,1,1,1) | East Petroleum | . | Nanjing | . | $Pipe_1$ | . | Control $Station_1$ |
| (2,2,2,1) | East Petroleum | . | Shanghai | . | $Pipe_2$ | . | Control $Station_1$ |
| (2,2,2,2) | East Petroleum | . | Shanghai | . | $Pipe_2$ | . | Control $Station_2$ |

| Address Table Entry | the Intranet domain name | corresponding IP address | equipment status |
|---|---|---|---|
| 1 | X | 100.101.10.102 | operating |
| 2 | X . XA | 100.101.14.103 | operating |
| 3 | X . XB | 100.102.15.104 | operating |
| 4 | X . XC | 100.103.16.107 | operating |
| 5 | X . XA . XAa | 100.101.101.150 | operating |
| 6 | X . XA . XAb | 100.102.102.151 | operating |
| 7 | X . XB . XBa | 100.102.103.152 | operating |
| 8 | X . XB . XBb | 100.103.104.153 | operating |
| 9 | X . XC . XCa | 100.103.105.154 | operating |
| 10 | X . XC . XCb | 100.101.101.100 | operating |
| 11 | X . XA . XAa . XAa1 | 100.102.101.101 | operating |
| 12 | X . XB . XBb . XBb1 | 100.103.104.101 | operating |
|  |  | 100.103.104.102 | standby |
| 13 | X . XB . XBb . XBb2 | 100.103.105.102 | standby |
|  |  | 100.103.105.103 | operating |
|  |  | 100.103.105.104 | standby |

METHOD FOR NETWORK DOMAIN NAME RESOLUTION AND THE RESOLUTION DEVICE THEREOF

CROSS REFERENCE TO RELATED PATENT APPLICATION

The present application is the US national stage of PCT/CN2008/072881 filed on Oct. 30, 2008, which claims the priority of the Chinese patent application No. 200810043697.5 filed on Aug. 11, 2008, which application is incorporated herein by reference.

FIELD OF THE INVENTION

The present invention relates to a method for network domain name resolution, especially to a method for domain name resolution in an industrial internet. The present invention also relates to a device for network domain name resolution.

DESCRIPTION OF THE PRIOR ART

The industrial internet is defined as a provided standardized technical means and technical platforms, for the intelligent devices in a wide area such as 'smart sensors, actuators and controllers' and etc., to realize the safe communication between the devices, or between the devices and the maintainers, or between the devices and the system of monitoring management, through a special network and a public network.

In the existing Internet, each node of the Internet (including the website, the server, the host computer and so on) has a corresponding steady (or static) IP address. In accordance with the protocol, the IP address is a bunch of segmented Arabic numerals which has a fixed length, such as 192.168.10.3. However, the IP address indicated with numbers is not easy to be remembered for people. To make the memorization convenient, a bunch of English letters (or the letters or characters of other languages), or figures, or the combination of both, respectively forming a domain name which is corresponding with the IP address, are used in the Internet. For example, 'www.sina.com', 'www.sipo.gov.cn', 'www.fudan.edu', and etc. are all the domain names easy to be remembered.

By this way, when the user inputs a domain name in the browser of a computer, the domain name will be sent to the domain name resolution system (DNS) of the Internet through the Internet Infrastructure. After the DNS receives the domain name, the DNS can search out the IP address corresponding to the domain name, and send it back to the browser of the user's computer. The process of resolving a domain name into an IP address is also called the process of resolution of IP address. After receiving the resolved IP address, the browser of the user's computer will send the IP address to the Internet, and the Internet will search out the network node corresponding to the IP address in accordance with the TCP/IP protocol, which enables communication between the browser of the user's computer and the found network node. The process of resolution of IP address through DNS and the process of searching out the corresponding network node according to the IP address are all the public technology which are clearly described in many textbooks and the books of computer network.

With the demand for the industrial automatic control development, it is required to conduct long-distance communication, supervision and control through all kinds of equipment inside the existing Internet structure and industrial internet. However, in the application of the industrial internet, for example, the monitoring network of the petroleum transmission pipeline in the petroleum industry is an Intranet or local area network with a large geographic scope. And each piece of intelligent electric device (IED) in the local area network shall be monitored and maintained. There are problems in the remote access through the remote access node of the existing Internet structure and industrial internet with a large geographic scope, the problems are list as below:

1. The IP address resource is insufficient. An industrial internet normally has hundreds and even thousands of network nodes. If each internal node is distributed with a static IP address, it will be impossible in considering of the resource aspect, and the cost will be very high in the same time.

2. The safety requirements are unable to be met. Most of industry control equipments in the industrial internet have high safety requirements. Through the observation and analysis by the inventors, an access control in hierarchical tree structure should better be used in the network node of the industrial internet and the ability of safety will be increased accordingly. For example, in the electric power supply system, the hierarchy exists in the IED not only from high voltage to low voltage, but also from the centralized control center to the master station and to the substation. For another example, in the pipeline for petroleum transmission in the petroleum industry, the hierarchy exists in the IED from the centralized control center to the main transmission station and to the substation.

However, the existing resolution structure of the DNS of the Internet is a flat structure (such as com, edu, org, gov, etc.), which mainly in form of a name of host computer.a domain name of top level. The node equipment of a small-scale local area network (LAN) is mainly identified by IP address instead of domain name management. Although the internal nodes of some large-scale LAN are applied with domain name management, all nodes of the whole network are on the same level without hierarchy. Moreover, the resolution method of the Internet address is generally through the ARP address resolution protocol, so, when there is a plurality of levels among the remote access nodes in the network, the ARP address resolution protocol is unable to search out the remote access node with lower level.

3. The efficiency of the existing resolution of IP address is low. If there are hundreds and even thousands of network nodes in an industrial enterprise, the efficiency will be low and the access speed will be affected if the first access to each node requires the IP address resolved by the DNS in the Internet.

4. Many IED equipments are connected through the USB port or parallel port or serial port, and cannot be accessed according to IP address directly through the TCP/IP network structure.

5. In the industrial automatic system, to make the system safe, some important nodes have redundancy configuration, that is, one node is distributed for two or more sets of equipment, and the equipment in the host computer (operating) status occupies the IP address of the node distributed, while the standby equipments in the redundant spare computer are in the isolated status. But the DNS in the Internet cannot identify the redundant equipment at all.

SUMMARY OF THE INVENTION

It is a first object of the present invention to provide a method of network domain name resolution which can be applied in the industrial control system, to handle a plenty of network nodes in the industrial internet with a small quantity of static IP addresses.

The second object of the present invention is to provide a method of network domain name resolution with safer capability which is adapted to the requirement of the industrial control system.

The third object of the present invention is to provide a method of network domain name resolution with higher efficiency which is adapted to be applied in the industrial control system.

The fourth object of the present invention is to provide a resolution method for the address of network node which is adapted to be applied in the industrial control system and the IP address of the redundant equipment node can also be achieved.

The fifth object of the present invention is to provide a resolution method for the address of network node which is adapted to be applied in the industrial control system and compatible with the existing structure and protocol of the Internet.

For achieving above stated first object, the present invention provides a method for network domain name resolution, wherein the domain name comprising a first portion domain name and a second portion domain name, and the resolution method comprising following steps:

1) In a first network system, resolving the first portion domain name into a first network address;

2) In the first network system, searching for a first network node corresponding to the first network address according to the resolved first network address;

3) In a second network system, resolving the second portion domain name into a second network node address, and the domain name resolution system of the second network system being independent of the domain name resolution system of the first network system.

Compared with the prior art, this present invention has following advantages:

① As the resolution structure of the domain name in the Intranet is independent of the resolution structure of the domain name in the Internet, the IP address of the Intranet will not occupy the IP address resource of the Internet.

② As the resolution structure of the domain name in the Intranet is a hierarchical tree structure, the resolution structure of the network address has much safer capability.

③ In the present invention, each sub-node in the tree structure of Intranet can be set as the entry node of Intranet, so that the route of address resolution can be shortened, and the domain name resolution structure of Intranet will has higher efficiency of the resolution of network node address accordingly.

④ As one domain name in Intranet can be distributed with a plurality of Intranet IP addresses with IP address equipment status, the domain name resolution system of Intranet can be applied to resolve the IP address of the redundant equipment node accordingly.

⑤ As the server with IP address in Intranet is connected with the IED equipment, it will be possible for the Wide Area Network including TCP/IP protocol and the Local Area Network including the Ethernet protocol to communicate with all kinds of IED equipment.

⑥ Moreover, as the Intranet entry server and the URL are used for transferring the Intranet domain name and other information, the domain name resolution structure in Intranet of the invention is compatible with the existing structure and protocol of the Internet.

BRIEF DESCRIPTION OF THE DRAWINGS

FIG. 5B is an illustration of an example of the domain name structure of the network node of the Intranet domain name resolution structure 104.

FIG. 8 is a table 802 of an embodiment of the IP address and the Intranet domain name.

DETAILED DESCRIPTION OF THE PREFERRED EMBODIMENT

Figure 1:
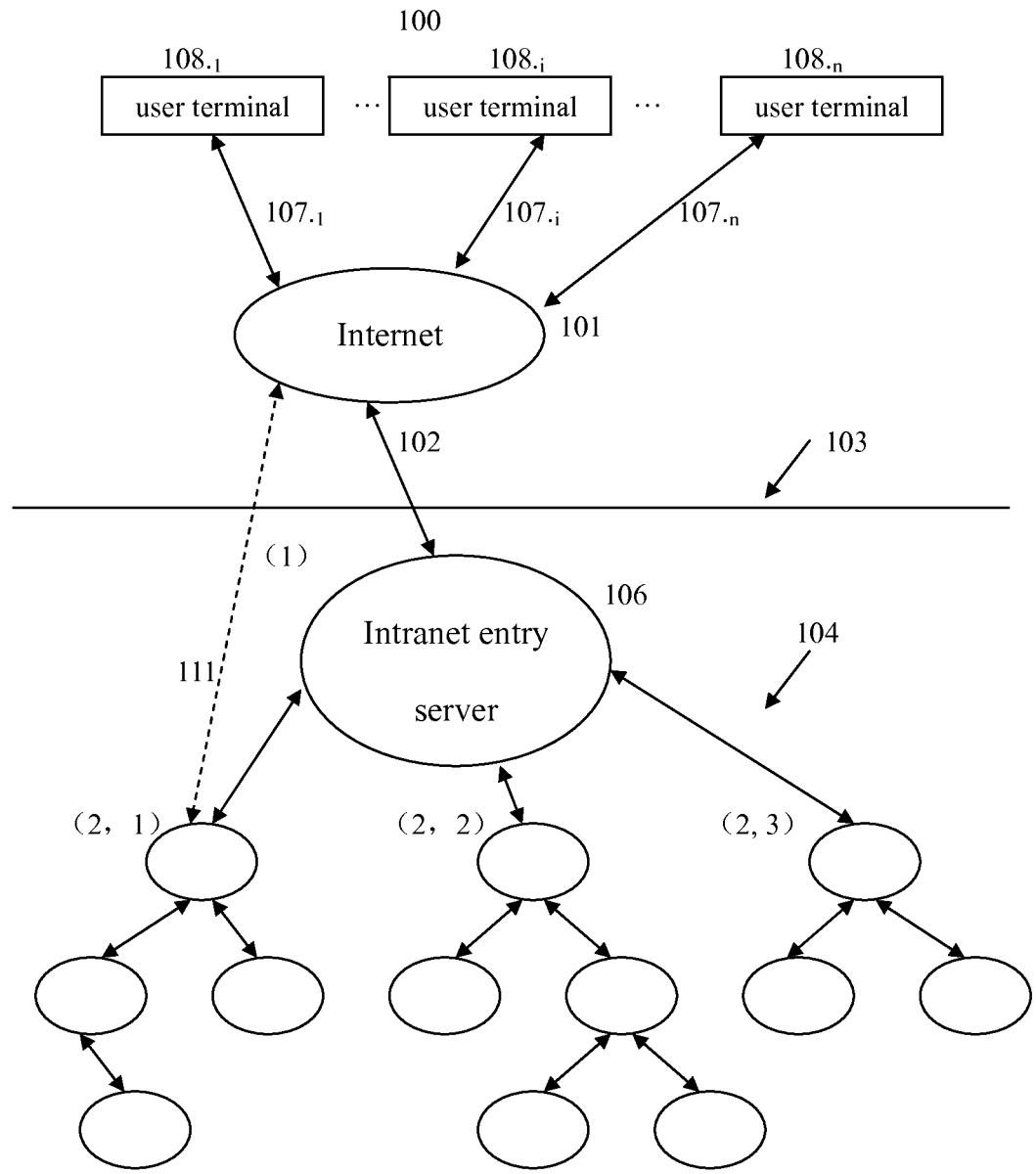
FIG. 1 is an illustration of the network structure 100 comprising the domain name resolution structure 104 of the present invention.
Figure 3:
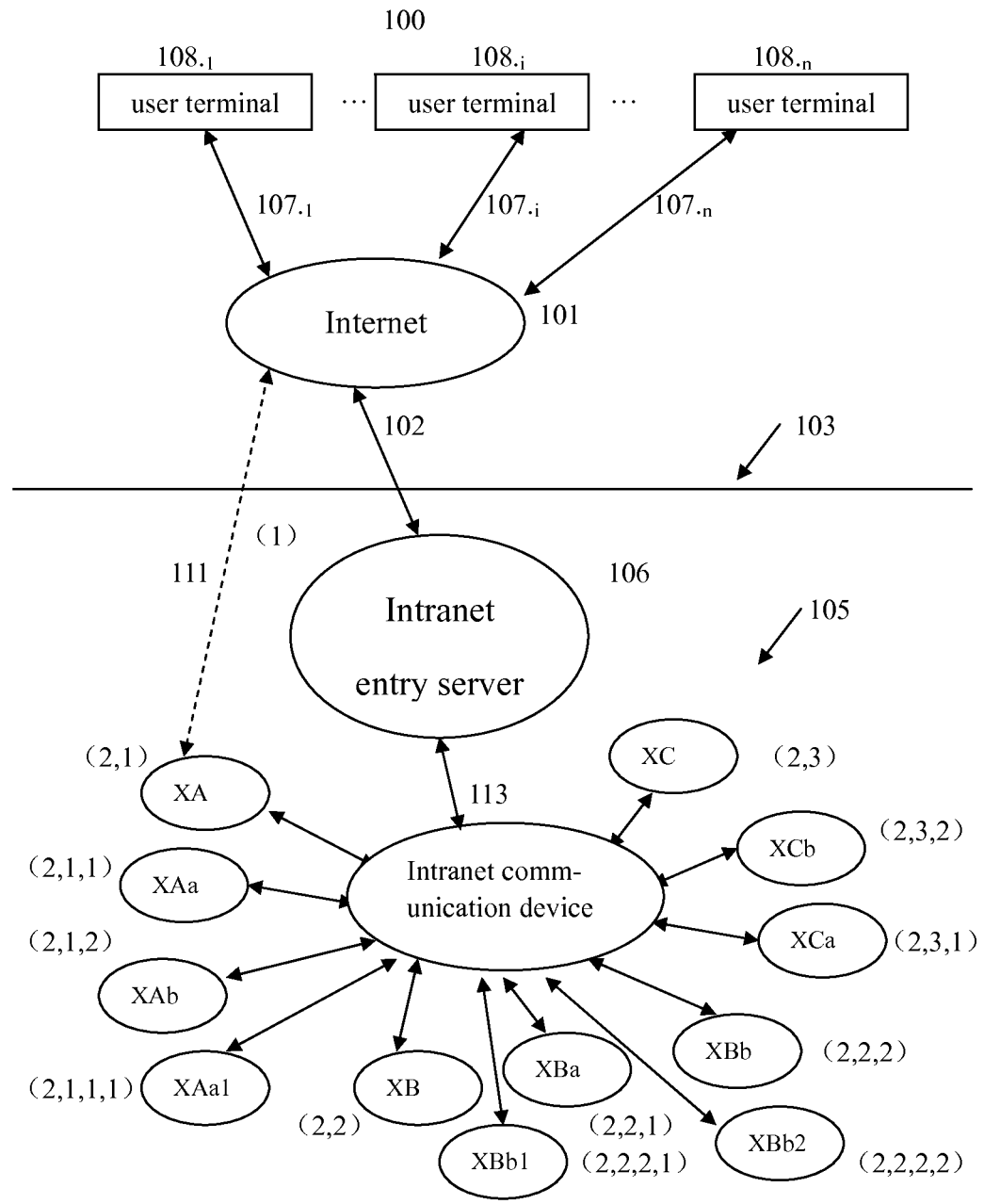
FIG. 3 is an illustration of the network structure 100 comprising the Intranet communication device 105 of the present invention.

To enable a further understanding of the innovative and technological content of the invention herein, refer to the detailed description of the invention and the accompanying drawings below:

FIG. 1 is an illustration of the network structure 100 of the present invention, which comprises the Internet 101 and the Intranet 103. The Internet 101 has N user terminals ($108._1, \ldots, 108._i, \ldots, 108._N$) and an Intranet entry server 106. The N user terminals ($108._1, \ldots, 108._i, \ldots, 108._N$) are respectively connected with the Internet 101 through network connections ($107._1, \ldots, 107._i, \ldots, 107._N$) and each user terminal is equipped with a browser. The entry server 106 of the Intranet is connected with the Internet 101 through a network connection 102. The Intranet 103 comprises an Intranet domain name resolution structure 104 and an Intranet Infrastructure 105 (as shown in FIG. 3). The Internet 101 is connected with the Intranet entry server 106 through the network connection 102, so as to make the Internet 101 be connected with the Intranet domain name resolution structure 104 and the Intranet Infrastructure 105 of the Intranet 103. While, in the Intranet domain name resolution structure 104, the network nodes are arranged in hierarchical tree structure.

Figure 2:
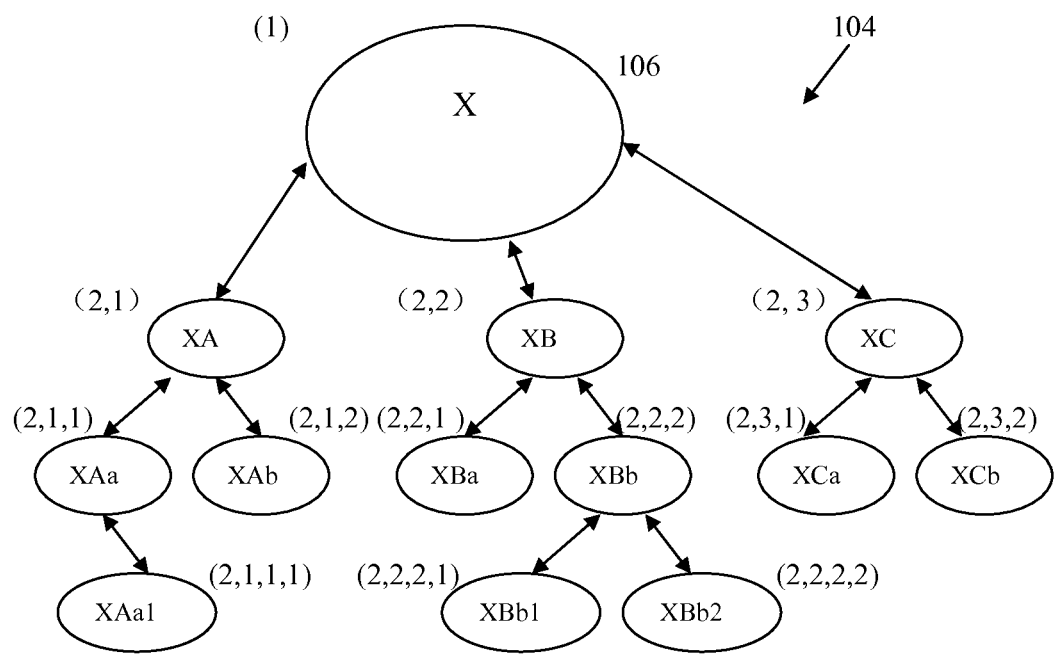
FIG. 2 is an illustration of the tree network structure used in the domain name resolution structure 104 in the industrial control Intranet 103 of the present invention.

To make the illustration convenient, FIG. 2 is schematic identifications illustrated for the network node of the Intranet domain name resolution structure 104 in FIG. 1. The root network node (1) of the Intranet domain resolution structure 104 has a corresponding Internet static IP address and comprises one Intranet entry server 106. The identifications of the nodes in the second level of the Intranet domain resolution structure 104, are (2,1), (2,2) and (2,3); The identifications of the nodes in the third level are (2,1,1), (2,1,2), (2,2,1), (2,2,2), (2,3,1) and (2,3,2); And the identifications of the nodes in the fourth level are (2,1,1,1), (2,2,2,1) and (2,2,2,2). As shown in FIG. 2, each network node has a schematic name represented in English letters. For example, the name of the node (1) is 'X', the name of the node (2,1) is 'XA', the name of the node (2,1,2) is 'Xab', the name of the node (2,2,2,2) is 'XBb2'. It shall be pointed out that the hierarchical tree structure is just a schematic diagram to explain the principle of the hierarchical tree structure. And compared with FIG. 2, a specific hierarchical tree structure can be set with more levels and a certain network node can be set with more sub-nodes.

In FIG. 2, each network sub-node in the Intranet domain name resolution structure 104 includes a server which has the same (or similar) structure and function with the root node. Each server is connected with at least one piece of IED equipment and can operate and control the connected IED equipment directly. To make the illustration convenient, it is supposed that there are total 13 sets of IED equipment in a certain industrial enterprise, they are IED (1), IED (2,1), IED (2,2), IED (2,3), IED (2,1,1), IED (2,1,2), IED (2,2,1), IED (2,2,2), IED (2,3,1), IED (2,3,2), IED (2,1,1,1), IED (2,2,2,1) and IED (2,2,2,2) (all not shown in figure), and each IED equipment is connected with the network node of the same label in FIG. 2 as the corresponding IED equipment has. And it is supposed that the IED (2,2,2,1) has one redundant equipment, that is IED (2,2,2,1)$_{redundant\ 1}$, and IED (2,2,2,2) has two pieces of redundant equipment, they are IED (2,2,2,2)$_{redundant\ 1}$ and IED (2,2,2,2)$_{redundant\ 2}$.

FIG. 3 shows that the Intranet entry server 106 of the node (1) is connected with the Intranet Infrastructure 105 through the communication connection 113, and the other twelve nodes in the Intranet 103 are connected with the Intranet Infrastructure 105 through the corresponding communication connections. The Intranet entry server 106 communicates with the other twelve nodes in the Intranet 103 through the Intranet Infrastructure 105. The Intranet Infrastructure 105 can comprise the Wide Area Network meeting the TCP/IP protocol and the Local Area Network meeting the Ethernet protocol. The constitution, structure and setting of the Intranet Infrastructure 105 are all the public technology in the present field and are omitted to be described here.

Figure 4:
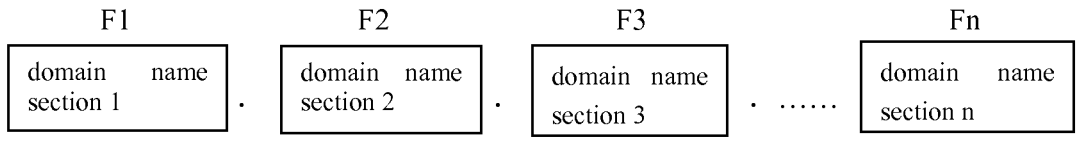
FIG. 4 is a parallel table of the node and format of the URL.

FIG. 4 is the domain name format used in the Intranet domain name resolution structure 104. As shown in FIG. 4, there are N domain name sections in the domain name format, F1, F2, . . . , Fn, which can form a tree structure that has N levels at the most. Each domain name section can reflect the route of one network node in each level of the tree structure. As shown in FIG. 4 as an example, one network node has N levels at the most.

Figure 5A:
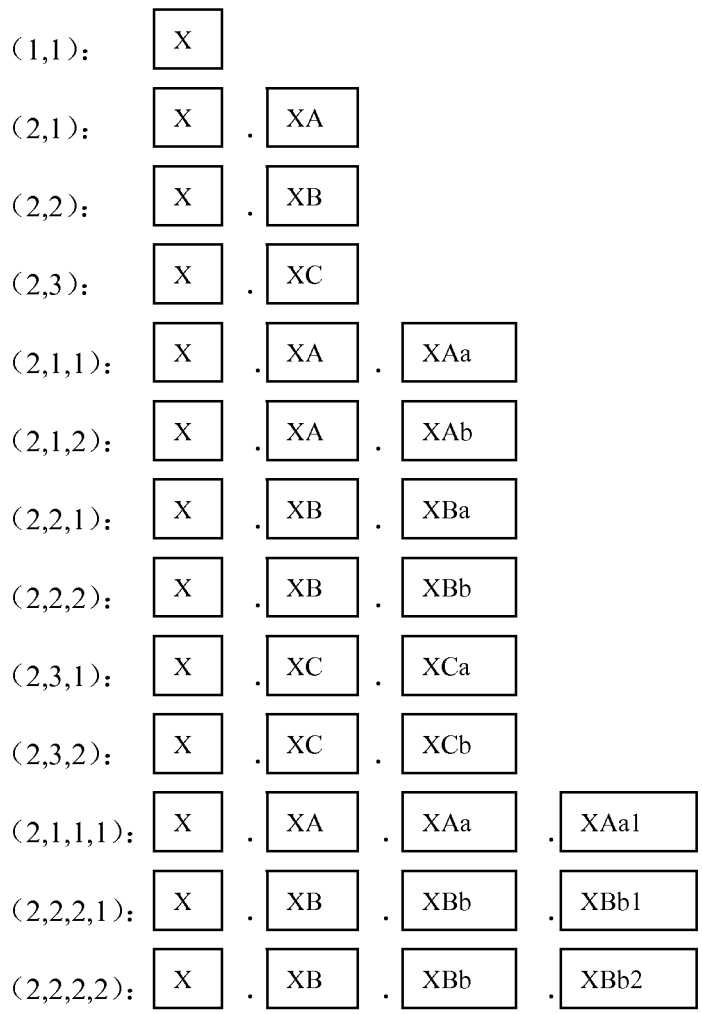
FIG. 5A is a schematic diagram of the domain name structure of the network node of the Intranet domain name resolution structure 104.

According to the principle in FIG. 4, FIG. 5A has listed the domain names of the network nodes of the Intranet domain name resolution structure 104. It shall be pointed out that FIG. 5A is just an embodiment of the domain name format of the invention, which explains the naming principle of the domain name of the present invention. For example, the first section of each domain name in FIG. 5A is X, which makes the domain name sections clear, but the different letters can be also used in the first section of the domain name in practice. The first letter of the second section of each domain name in FIG. 5A is X, which makes the domain name sections clear, but different letters can be also used in the second section of the domain names in practice. The same domain name sections in FIG. 5A are the letters with the same length, but letters with different length can be also used in the same domain name sections in practice. All domain name sections in FIG. 5A are letters, but the figures can be also used (or mixed used) in certain domain name sections in practice.

FIG. 5A shows the naming principle of the domain name format of the present invention. And FIG. 5B is a specific application embodiment of the domain name format shown in FIG. 5A. In the embodiment, it is supposed that the root node (1) X is East Petroleum. East Petroleum has three branch offices respectively in Nanjing, Shanghai and Hangzhou, and each branch office has two pipes, that is, Pipe$_1$ and Pipe$_2$. Some pipes are equipped with two control stations, Control Station$_1$ and Control Station$_2$. In the petrol oil pipe, IED equipments are in different types, such as the programmable logic controller (PLC), flow calculation computer, chromatographic analyzer, and etc. The domain name section formats shown in FIG. 4, FIG. 5A and FIG. 5B also reflect the characteristics of the hierarchical tree structure of the domain name resolution of the present invention. In the embodiment shown in FIG. 5B, the Intranet domain name section 1 (East Petroleum) of the Intranet entry server 106 can be the same domain name as the Intranet entry server 106 in the Internet, which will make the unified identification of the inner and outer network domain name, so as to be more convenient for people.

In the prior art of the Internet, the browser sends URL to the Internet to require for service. Generally, one URL consists of three portions:

The protocol portion is the service protocol (or the service content), such as HTTP or FTP;

The first portion is the domain name, such as www.sina.com, and the protocol portion and the first portion are separated by "://";

The second portion is the optional part which is generally used to transmit the parameter (such as the web address in the website).

In the present invention, the domain name and other parameters (such as the password, Intranet service request and so on) of the network node of the Intranet domain name resolution structure 104 are set in the second portion of URL.

When a user terminal is communicating with any network node of the Intranet domain name resolution structure 104 listed in FIG. 2, firstly the domain name and password of the Intranet node should be set in the second portion (optional portion) of the URL. The present invention provides two methods to set the domain name and password of the Intranet node in the second portion of the URL and send the domain name and password of the Intranet node and Intranet service request to the node (1) of the Intranet domain name resolution structure 104. (The node (1) includes the Intranet entry server 106.)

Figure 6:
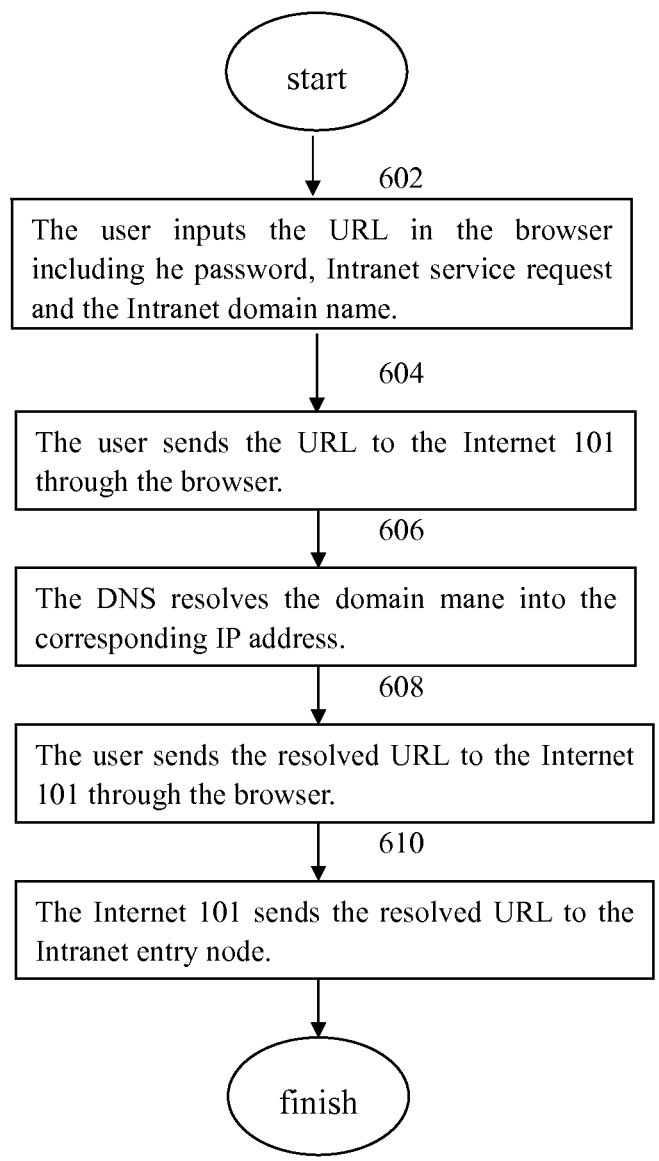
FIG. 6 is a flow chart of the first embodiment of the method for users to send the domain name and password of the Intranet node and Intranet service request to the node (1) of the Intranet domain name resolution structure 104.

Combining with FIG. 6, the first method of the present invention, that certain user terminal 108.$_i$ sends the domain name and password of the Intranet node and Intranet request to the node (1) of the Intranet domain name resolution structure 104 through URL, is described as below. It is supposed that the domain name of the Intranet entry (node (1)) is www.eastpetroleum.com, and the corresponding Internet IP address is 192.168.10.3.

In Step 602, the user inputs URL (including the domain name) through the browser and inputs the password, Intranet service request and Intranet domain name into the second portion of the URL.

For example, the content the user inputs is http://www.eastpetroleum.com/password/Intranet service request/Intranet domain name/.

In Step 604, the user sends URL to the Internet 101 through the browser.

In Step 606, the DNS in the Internet 101 resolves the domain mane www.eastpetroleum.com into the corresponding IP address. After resolution, the URL becomes into http://192.168.10.3/password/Intranet service request/Intranet domain name/.

In Step 608, the user sends the resolved URL to the Internet 101 through the browser.

In Step 610, the router in the Internet 101 sends the URL resolved according to the TCP/IP protocol to the Intranet entry (node (1)).

Figure 7:
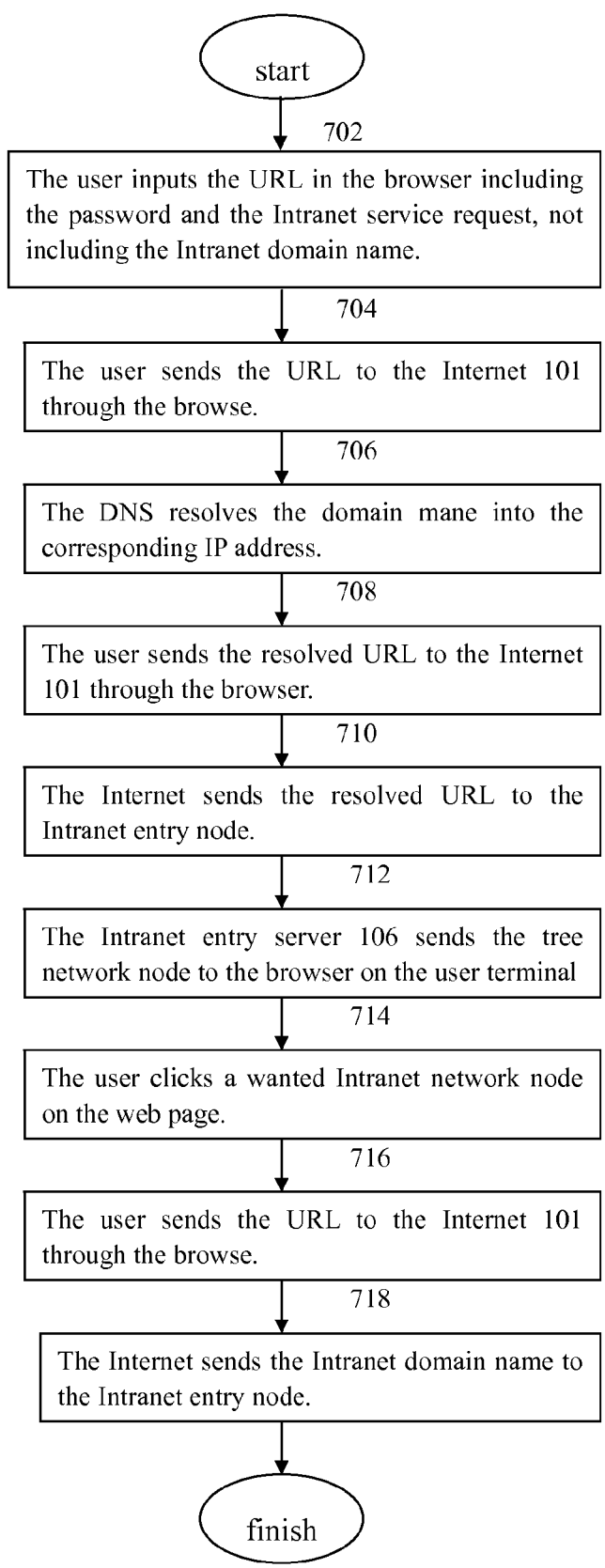
FIG. 7 is a flow chart of the second embodiment of the method for users to send the domain name and password of the Intranet node and Intranet service request to the node (1) of the Intranet domain name resolution structure 104.

Combining with FIG. 7, the second method of the present invention, that certain user terminal $108._i$ sends the domain name and password of the Intranet node and Intranet request to the node (1) of the Intranet domain name resolution structure 104 through URL, is described as below. It is also supposed that the domain name of the Intranet entry (node (1)) is www.eastpetroleum.com, and the corresponding Internet IP address is 192.168.10.3.

In Step 702, the user inputs the URL including domain name, password and service request through the browser (but not inputs the Intranet domain name). For example, the content the user inputs is http://www.eastpetroleum.com/password/Intranet service request/.

In Step 704, the user sends the URL to the Internet 101 through the browser.

In Step 706, the DNS in the Internet 101 resolves the domain mane www.eastpetroleum.com into the corresponding IP address. After resolution, the URL becomes into http://192.168.10.3/password/Intranet service request/Intranet service request/.

In Step 708, the user sends the resolved URL to the Internet 101 through the browser. The URL also includes the IP address of the user terminal $108._i$.

In Step 710, the router in the Internet 101 sends the URL resolved according to the TCP/IP protocol to the Intranet entry (node (1)).

In Step 712, the Intranet entry server 106 in Intranet entry (node (1)) sends the tree network node shown in FIG. 2 through Internet 101 to the browser on the user terminal $108._i$, in the form of HTML page according to the IP address of the user terminal $108._i$.

In Step 714, the users chooses (clicks) the wanted Intranet network node on the web page. As an application is set on the web page, the application can transfer the chosen network node into Intranet domain name and input the Intranet domain name into the corresponding position. By this way, the URL has the Intranet domain name and becomes the form as following: http://192.168.10.3/password/Intranet service request/Intranet domain name/.

In Step 716, the user sends the URL to the Internet 101 through the browser.

In Step 718, the router in the Internet 101 sends the URL including the password, Intranet service request and Intranet domain name to the Intranet entry (node (1)) according to the TCP/IP protocol.

FIG. 8 is a table 802 of the Intranet domain name and its corresponding the IP address. As shown in FIG. 8, each Intranet domain name has one address table entry and each address table entry has at least one Intranet IP address. The section and form of the Intranet IP address can be the same with that of the outer net. But each IP address has one operating status bar which indicates the operating status of the corresponding IED. When one address table entry has only one Intranet IP address, then the one corresponding IED is always on the operating status. When one address table entry has a plurality of Intranet IP addresses, then only one IED of a plurality of corresponding IEDs is on the operating status, while other corresponding IEDs are on the standby status. The operating status of the table 802 of the Intranet domain name and its corresponding the IP address can be updated regularly according to the Intranet 103 and the domain name resolution structure 104. The table 802 is stored in the Intranet entry server 106 and used for transferring the Intranet domain name into its corresponding Intranet IP address.

It shall be pointed out that the Intranet entry node (1) (or Intranet entry server 106) has one Internet IP address (192.168.10.3) and one Intranet IP address (100.101.10.102). The Internet IP address (192.168.10.3) of the Intranet entry node (1) is used when communicating with all nodes in the Internet. And the Intranet IP address (100.101.10.102) of the Intranet entry node (1) is used when communicating with all nodes in the Intranet.

Figure 9:
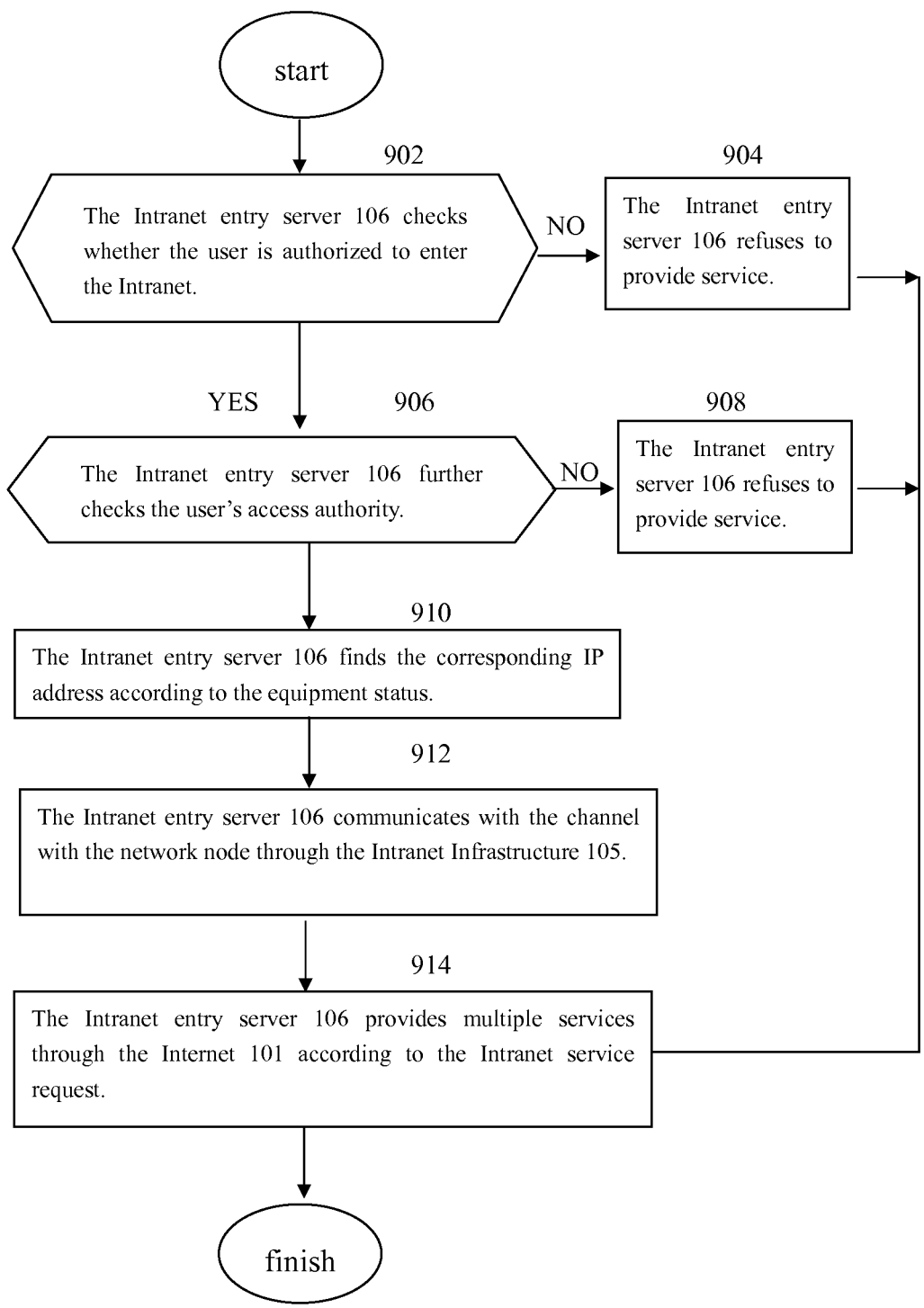
FIG. 9 is a flow chart of the Intranet entry server 106 resolving the Intranet domain name into the Intranet IP address and searching out the corresponding Intranet network node and providing service after receiving URL of the present invention.

FIG. 9 is a flow chart of the Intranet entry server 106 resolving the Intranet domain name into the Intranet IP address, searching out the corresponding Intranet network node and providing service after received URL in the present invention.

In Step 902, the Intranet entry server 106 checks whether the user is authorized to enter the Intranet.

In Step 904, if the user is not authorized to enter the Intranet, the Intranet entry server 106 will refuse to provide service and the program ends.

In Step 906, if the user is authorized to enter the Intranet, the Intranet entry server 106 then will further check the user's access authority.

In Step 908, if the access exceeds the access authority, the Intranet entry server 106 then will refuse to provide service.

The access authority is based on the hierarchical tree structure. The access authority of one user is set on a certain node, and the user can only access the node and the nodes below that level instead of the nodes above that level. Taking the hierarchical tree structure in FIG. 2 as an example, if the access authority of one user is set on the root node (1), then the user can access the root node (1) and all nodes below (that is all the nodes in the hierarchical tree structure in FIG. 2), and if the access authority of one user is set on one sub-node (such as node (2,3)), then the user can only access the node (node (2,3)) and the nodes below that level (node (2,3,1) and (2,3, 2)).

In Step 910, the Intranet entry server 106 compares the Intranet domain name of URL with the table 802 and searches out the IP address of which the equipment status is 'operating' in the corresponding address table entry. When there is only one Intranet IP address in the corresponding address table entry, the Intranet IP address is the wanted Intranet IP address, as the equipment of the corresponding Intranet IP address is on 'operating' status. When there is a plurality of Intranet IP addresses in the corresponding address table entry, the Intranet entry server 106 searches out the Intranet IP address whose the equipment status is 'operating' in the Intranet IP addresses.

For example, the Intranet domain name 'X.XB.XBb.XBb2' address table entry has three corresponding Intranet IP addresses. For the IP address resolution of the Intranet domain name 'X.XB.XBb.XBb2', as the equipment status of the Intranet IP address '100.103.105.103' is 'operating', the Intranet entry server 106 finds the Intranet IP address '100.103.105.103'. If the equipment status of the Intranet IP address '100.103.105.103' is changed as 'standby' in future and the equipment status of the Intranet IP address '100.103.105.102' is changed as 'operating', then, for the IP address resolution of the Intranet domain name 'X.XB.XBb.XBb2', the Intranet entry server 106 will search out the IP address '100.103.105.102'. In the present invention, the IP address of the redundant equipment can be resolved, through setting a plurality of Intranet IP addresses for one Intranet domain name and setting equipment status ('operating' or 'standby') for each Intranet IP address.

Figure 10:
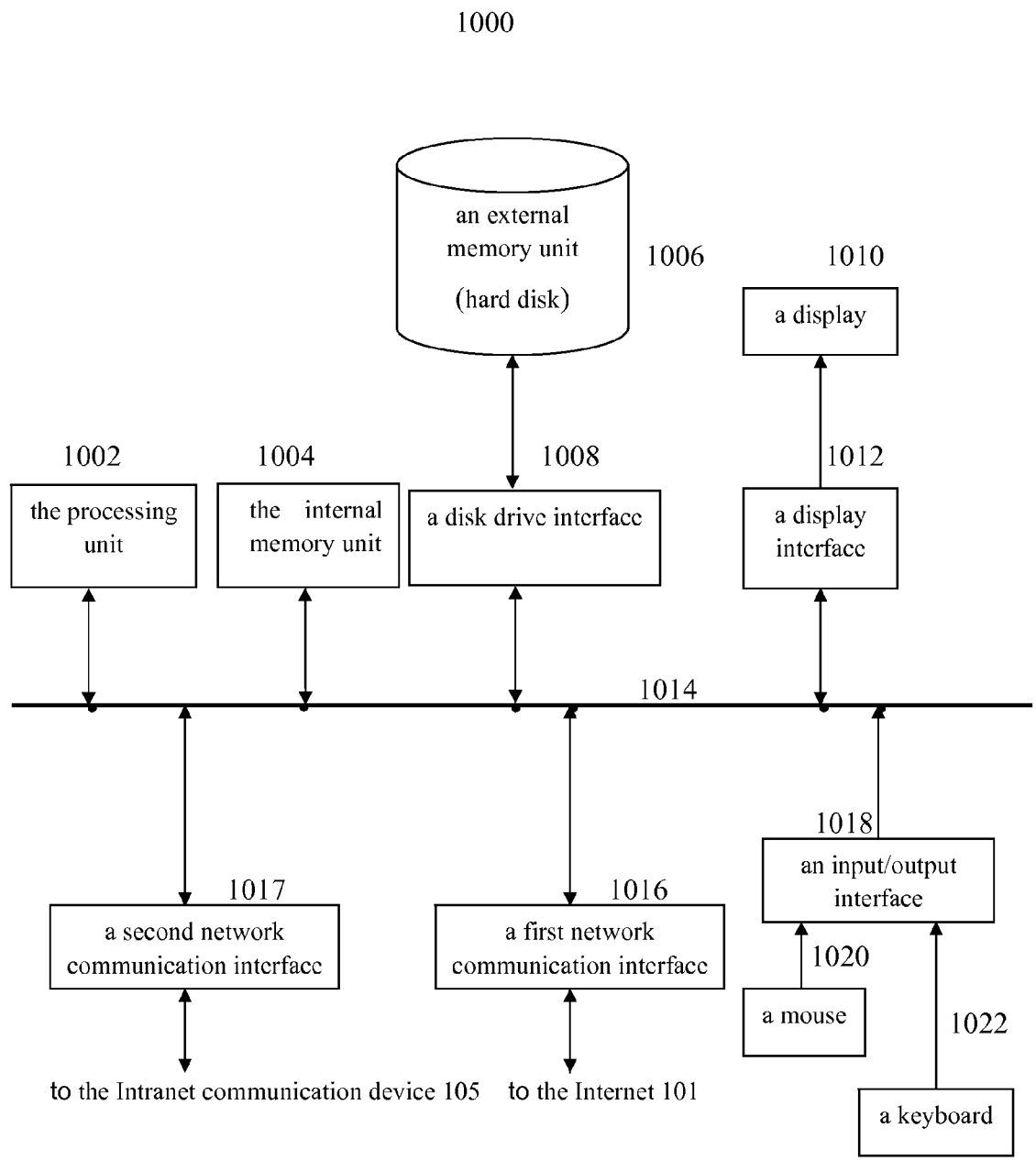
FIG. 10 is a demonstrated illustration of the Intranet entry server 106 in the root node.

In Step 912, the Intranet entry server 106 uses the second network communication interface 1017 shown in FIG. 10 to communicate with the channel that can communicate with the network node corresponded with the IP address which is searched out by the Intranet, through the Intranet Infrastructure 105 shown in FIG. 3. To make the illustration convenient, it is supposed that the corresponding network node of the Intranet IP address is (2,3,1).

In Step 914, the Intranet entry server 106 uses the first network communication interface 1016 shown in FIG. 10 to provide a plurality of services including human-computer interface service and remote diagnosis service to the user terminal through the Internet 101 according to the Intranet service request in URL.

For the human-computer interface service request, the server in the node (2,3,1) collects the human-computer interface service parameters from IED (2,3,1) through the interface route to form the human-computer interface service web page in HTML and sends the web page to the Intranet entry server 106. Then, the Intranet entry server 106 sends the human-computer interface service web page to the user terminal.

For the remote diagnosis service, the server in the node (2,3,1) operates the diagnosis program on IED (2,3,1) through the interface route and sends the operating result of the diagnosis program to the Intranet entry server 106 in the form of HTML web page. Then, the Intranet entry server 106 sends the operating result of the diagnosis program to the user terminal in the form of HTML web page.

In the above stated embodiments, the root node (1) is set as the entry node. In the present invention, as there is one server in each sub-node, only if each sub-node is distributed with one static IP address and corresponding domain name and connected with the Internet 101, all sub-nodes can be confiiged as the entry nodes. For example, in FIG. 1 and FIG. 3, if the sub-node (2, 1) is distributed with one static IP address and one corresponding domain name are to, and the node (2, 1) is connected directly with the Internet 101 through the network connection 111 shown in FIG. 1 and FIG. 3, the users on the Internet 101 can access the Intranet 103 through the point (2, 1) as a second entry node. By this way, one Intranet can have a plurality of entries. The characteristic is necessary for of the multi-level Intranet, as the lower-level node used as the entry can accelerate the access speed. In addition, in the present invention, the Intranet domain name resolution system is independent of the Internet domain name resolution system.

FIG. 10 shows the demonstrative structure of the Intranet entry server 106 in the root node. As shown in FIG. 10, the Intranet entry server 106 includes a processing unit 1002, an internal memory unit 1004, an external memory unit (hard disk) 1006, a disk drive interface 1008, a display 1010, a display interface 1012, a first network communication interface 1016, a second network communication interface 1017, an input/output interface 1018, a mouse 1020, a keyboard 1022 and a set of system bus 1014.

The external memory unit (hard disk) 1006 is connected with the disk drive interface 1008; the display 1010 is connected with the display interface 1012; and the mouse 1020 is connected with the keyboard 1022 and the input/output interface 1018.

The processing unit 1002, the internal memory unit 1004, the disk drive interface 1008, the display interface 1012, the first network communication interface 1016, the second communication interface 1017 and the input/output interface 1018 are respectively connected with the system bus 1014.

The internal memory unit 1004 and the external memory unit 1006 can store the program, instruction and data. Generally, the access speed of the internal memory unit 1004 is faster, while the memory capacity of the external memory unit 1006 is larger. The display 1010 can provide a visual interface between the program being executing and the user. The first network communication interface 1016 can provide a communication interface between the server and the Internet 101; and the second network communication interface 1017 can provide a communication interface between the server and the Intranet 103.

The processing unit 1002 can read the program, instruction and data in the internal memory unit 1004 and the external memory 1006 and control the server operation by implementing the programs and the instructions.

The Intranet domain name address table 802 is stored in the internal memory unit 1004 or the external memory unit 1006. In the flow charts 6, 7 and 9, the program steps implemented by the Intranet entry server should also be stored in the internal memory unit 1004 or the external memory unit 1006.

The demonstrative structure of the Intranet entry server 106 of the root node shown in FIG. 10 also can be applied in the servers of the other nodes in the Intranet domain name resolution structure 104. It shall be pointed out that the servers in other nodes only store the Intranet domain name address tables of the nodes of the level and sub-nodes below the level. Hence, the server in one sub-node can only resolve the network address of the nodes of the level and sub-nodes below the level and access the nodes of the level and sub-nodes below the level.

What is claimed is:

1. A method for network domain name resolution, characterized in that, the domain name comprising a first portion domain name and a second portion domain name, and the resolution method comprising following steps:

resolving, by a first network system, the first portion domain name, received from a user terminal device, into a first network address, the first network address being an Internet Protocol (IP) address;

searching, by the first network system, for a first network node corresponding to the first network address according to the first network address;

sending, from the user terminal device, the second portion domain name with the first network address to an intranet server identified by the first network node, the second portion domain name mapping to one or more intranet addresses, each intranet address having a status, wherein if the second portion domain name maps to more than one intranet address, only one intranet address has the status set to operating and remaining intranet addresses have the status set to standby; and resolving the second portion domain name into a second network node on a second network system identified by a second network node address, by selecting an intranet address having the status set to operating and assigning the selected intranet address as the second network node address, and the domain name resolution system of the second network system being independent of the domain name resolution system of the first network system, wherein the first network node is also identified by a second network address different from the first network address, the second network address is used by the second network node addressing the first network node.

2. The method for network domain name resolution of claim 1, wherein the method also comprises following step:
   in the second network system, searching for the second network node corresponding to the second network address according to the second network address.

3. The method for network domain name resolution of claim 2, wherein the first network node is an entry node of the second network system.

4. The method for network domain name resolution of claim 3, further the following step:
   accessing, by the user terminal device, the second network node through the first network system, the second network system, and the first network node.

5. The method for network domain name resolution of claim 4, wherein the second network system provides services to the user terminal device for the second network node through the first network node.

6. The method for network domain name resolution of claim 5, wherein the second portion domain name is treated as additional information set on a parameter portion of URL.

7. The method for network domain name resolution of claim 6, wherein the second portion domain name comprises a service requirement which is treated as additional information set on the parameter portion of URL.

8. The method for network domain name resolution of claim 7, wherein the method further comprises the following step:
   comparing the second portion domain name with a table, in which the domain name being defined to correspond to at least one IP address of the second network system.

9. The method for network domain name resolution of claim 1, wherein a resolution structure of the second network system is a tree structure, and the second network system has more than one entry nodes.

10. A method for network domain name resolution, comprising the following steps:
   receiving, by an entry node of a second network system, information including a domain name of the second network system from a first network system, the entry node of the second network system also being a node on the first network system;
   resolving, by the first network system, an Internet Protocol (IP) address of the entry node;
   searching, by the first network system, the entry node according to the IP address of the entry node;
   resolving, by entry node of the second network system, an intranet address corresponding to the domain name of the second network system, the domain name of the second network system being mapped to one or more intranet addresses on the second network, each intranet address having a status, wherein if the domain name of the second network system maps to more than one intranet address, only one intranet address has the status set to operating and remaining intranet addresses have the status set to standby; and
   searching, by the second network system, a node of the second network system corresponding to the intranet address of the domain name of the second network system by selecting the intranet address having the status set to operating and identifying the node associated with the selected intranet address,
   wherein the entry node of the second network system is also identified by a second network address different from the IP address, the second network address is used by the second network system addressing the entry node.

11. The method for network domain name resolution of claim 10, wherein a domain name resolution system of the second network system is independent of a domain name resolution system of the first network system.

12. The method for network domain name resolution of claim 10, wherein the information from the first network system further comprises service requirements to the second network system, further comprising the following step:
   providing a service to the first network system according to the service requirements.

13. The method for network domain name resolution of claim 10, wherein the information received from the first network system is set in URL format.

14. The method for network domain name resolution of claim 10, further comprising the following step:
   comparing the domain name of the second network system with a table, in which the domain name is defined to correspond to at least one second network address of the second network.

15. The method for network domain name resolution of claim 10, wherein a resolution structure of the second network system is a tree structure.

16. The method for network domain name resolution of claim 10, wherein the second network system has more than one entry nodes.

17. A device for network domain name resolution comprising:
   a receiving device for receiving the information including a domain name of a second network system sent from a first network system; and
   a processing device for
      resolving the domain name of the second network system sent from the first network system into an entry node of the second network system identified by an intranet address of the domain name of the second network, the domain name of the second network system being mapped to one or more intranet addresses on the second network, each intranet address having a status,
      selecting, if the domain name of the second network system maps to more than one intranet address with only one intranet address having the status set to operating, an intranet address having the status set to operating, and
      identifying a node associated with the selected intranet address;
   wherein a domain name resolution system of the second network system is independent of a domain name resolution system of the first network, and the entry node is also identified by a first network address different from the intranet address, the intranet address is used by the second network system addressing the entry node.

18. The device for network domain name resolution of claim 17, further comprising a storing device for storing one table with the plurality of intranet addresses.

* * * * *